United States Patent [19]
Houde

[11] Patent Number: 5,940,798
[45] Date of Patent: Aug. 17, 1999

[54] FEEDBACK MODIFICATION FOR REDUCING STUTTERING

[75] Inventor: John F. Houde, San Francisco, Calif.

[73] Assignee: Scientific Learning Corporation, Berkeley, Calif.

[21] Appl. No.: 09/019,344

[22] Filed: Feb. 5, 1998

Related U.S. Application Data

[63] Continuation-in-part of application No. 09/001,508, Dec. 31, 1997.

[51] Int. Cl.$^6$ .............................. G10L 9/00; G09B 19/04
[52] U.S. Cl. ......................... 704/271; 704/275; 704/219; 434/185; 434/186; 600/24
[58] Field of Search .................................... 434/185, 187, 434/186; 600/24, 23; 704/270, 271, 275, 219

[56] References Cited

U.S. PATENT DOCUMENTS

| | | |
|---|---|---|
| 3,681,756 | 8/1972 | Burkhard et al. ..................... 340/172.5 |
| 3,920,903 | 11/1975 | Beller . |
| 4,020,567 | 5/1977 | Webster . |
| 4,143,648 | 3/1979 | Cohen et al. ................................ 128/1 |
| 4,421,488 | 12/1983 | Parlenvi et al. . |
| 4,464,119 | 8/1984 | Vildgrube et al. . |
| 4,662,847 | 5/1987 | Blum . |
| 4,685,448 | 8/1987 | Shames et al. .............................. 128/1 |
| 4,784,115 | 11/1988 | Webster . |
| 5,794,203 | 8/1998 | Kehoe .................................... 704/271 |

FOREIGN PATENT DOCUMENTS

| | | |
|---|---|---|
| 3506-092 | 8/1986 | Germany . |
| 1197-661 | 12/1985 | U.S.S.R. . |
| 1718911-A1 | 3/1992 | U.S.S.R. . |

OTHER PUBLICATIONS

J.F. Houde, *Sensorimotor Adaptation in Speech Production*, Department of Brain and Cognitive Sciences Massachusetts Institute of Technology, Feb., 1997.

R. Pollock et al., A Solid State Delayed Auditory Feedback System for Speech Therapy, *Biomedical Engineering*, Dec., 1976, pp. 413–414.

Hutchins ("Say & See: Articulation Therapy Software", proceedings of the Johns Hopkins national search for computing Applications to assist persons with disabilities, Feb. 1992, pp. 37–40).

Czyzewski et al., ("Digital Speech Aid to decrease stuttering–clinical results and patients reactions", Proceedings of First World Congress Fluency Disordrers, germany, Jan. 1994, pp. 526–529).

Awad et al., ("The application of digital Speech Processing to Stuttering Therapy", IEEE Instrumentation and Measurement Technology conference, Ottawa, canada, May 19–21, 1997, vol. 2, pp. 1361–1367).

*Primary Examiner*—David R. Hudspeth
*Assistant Examiner*—Vijay B. Chawan
*Attorney, Agent, or Firm*—Christensen O'Connor Johnson & Kindness PLLC

[57] ABSTRACT

A treatment system for reducing stuttering uses an auditory feedback modification technique to train the stutterer's speech motor control system to be more stable. The auditory feedback modification is based on a model of speech motor control in the human brain that incorporates a variation of observer-based control and Smith prediction. In addition, the Kalman gain of the model is set by comparing the speech muscular control signals sent to the person's vocal tract to the corresponding auditory speech sounds the person actually hears. It is believed that the speech motor control system of a stutterer has set the Kalman gain too high, thereby creating an unstable control system that in turn causes stuttering. A feedback modifier feeds back the stutterer's speech to the stutterer with a perturbation that is small enough to pass a validator function that is believed to be part of the speech motor control system. The small perturbations increase the difference between the target speech and the fed back speech, which is believed to cause the speech motor control system to decrease the Kalman gain. Over a treatment program, it is believed that the perturbations "train" or adapt the stutterer's speech motor control system so as to reduce the Kalman gain, which is further believed to persist when the auditory feedback is discontinued.

24 Claims, 6 Drawing Sheets

FEEDBACK MODIFICATION FOR REDUCING STUTTERING

CROSS-REFERENCE TO RELATED APPLICATIONS

The present application is a continuation-in-part of U.S. patent application Ser. No. 09/001,508 filed on Dec. 31, 1997 entitled "Feedback Modification For Accent Reduction" by John F. Houde and assigned to Scientific Learning Corporation, Berkeley, Calif., and which is incorporated herein by reference in its entirety.

FIELD OF THE INVENTION

The present invention relates to speech training and, more particularly, to methods and devices to reduce stuttering.

BACKGROUND

Stuttering is a fluency disorder experienced by an estimated one percent of the total population of the United States. Two of the chief symptoms of this disorder are the repeating of speech sounds and an inability to continue speaking (commonly referred to as "blocking"). There are many more symptoms of this disorder, sharing the characteristic of preventing the stutterer from producing fluent speech, as judged subjectively by the stutterer or other listeners.

Some studies directed toward reducing stuttering have shown that stuttering can be reduced by using auditory feedback. The term "auditory feedback" is used herein to refer to providing the speaker (i.e., the stutterer) with his or her own speech while the speaker is speaking. Thus, the speaker listens to himself or herself while speaking. One of these studies, for example, has shown that introducing a short delay (i.e., of about fifty milliseconds) in the auditory feedback will significantly reduce stuttering with little or no debilitating effects on the speaker's speech rate. In other studies, altering the spectrum of the auditory feedback or introducing strong masking noise also significantly reduces stuttering. However, once the auditory feedback is discontinued, the stutter-reducing effect disappears.

Figure 1:
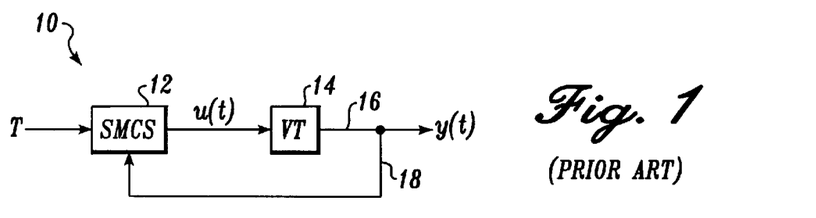
FIG. 1 is a simplified block diagram illustrative of a generalized model for speech production.

These results suggest a general negative feedback model of the speech motor control system (SMCS) in the speaker's brain. FIG. 1 is a simplified block diagram of a model 10 illustrative of a generalized control system for modeling speech production. Model 10 includes a SMCS 12 and a vocal tract 14. SMCS 12 receives a target sound T that the speaker wants to enunciate and generates speech muscular control signals u(t) to control the vocal tract articulators of VT 14. In response to speech control signals u(t), VT 14 produces audio speech sounds y(t) as indicated on audio path 16. SMCS 12 then receives auditory feedback signals as indicated along path 18. In general, the feedback along path 18 can be any form of feedback and is not limited to negative feedback.

Although these auditory feedback methods do provide relief for stutters, these methods generally do not represent a treatment or cure for stuttering. In addition, the stutterer generally must use the auditory feedback equipment whenever the stutterer wishes to speak without stuttering. Of course, many stutters would find carrying such equipment with them throughout the course of a day undesirably conspicuous and inconvenient. In addition, such equipment would be subject to occasional equipment failures and to exhaustion of the power storage devices (e.g., batteries) used to power the equipment. As can be imagined, such equipment problems would generally be extremely undesirable to the stutterer if such an event unexpectedly occurred while the stutterer was trying to speak. Furthermore, with extended use, other studies suggest that any particular form of altered feedback gradually looses its effect in preventing stuttering. Accordingly, there is a need for a method or system to reduce stuttering that avoids the requirement that the stutterer carry equipment, which tends to be subject to the undesirable attributes described above.

SUMMARY

In accordance with the present invention, a treatment system for reducing stuttering is provided. In one aspect of the present invention, an auditory feedback modification technique is used to adapt or train the stutterer's speech motor control system to be more stable. The auditory feedback modification is based on a model of speech motor control in the human brain that incorporates a variation of observerbased control and Smith prediction, adapted from modern engineering control theory. In addition, it is believed that a person's speech motor control system sets the Kalman gain of the observer-based control system by comparing the speech muscular control signals sent to the person's vocal tract to the auditory speech sounds the person actually hears that were produced by the vocal tract in response to these speech control signals. It is believed that the speech motor control system of a stutterer has set the Kalman gain too high, thereby creating an unstable control system that in turn causes stuttering. One way to stabilize this type of control system is to reduce the Kalman gain.

In one embodiment, the stutterer uses a feedback modifier during a treatment or therapy program. During this treatment program, as the stutterer is speaking, the feedback modifier feeds back the stutterer's speech to the stutterer so that the speaker in effect hears what he or she is saying while saying it. In addition, the feedback modifier introduces a perturbation to the fed back speech that is small enough to pass a validator function that is believed to be part of the speech motor control system. When speech motor control system compares the fed back speech to the speech muscular control signals sent to the vocal tract, the small perturbations increase the difference between the target speech and the fed back speech, thereby causing the speech motor control system to be driven to decrease the Kalman gain. Over a treatment program, it is believed that the perturbations "train" or adapt the stutterer's speech motor control system so as to reduce the Kalman gain, which is further believed to persist when the auditory feedback is discontinued. Thus, unlike the systems used in the aforementioned studies, the stutterer is free (after the treatment program) of special auditory feedback equipment, thereby avoiding the inconvenience, conspicuousness and reliability problems inherent in the auditory feedback equipment required by these systems.

DETAILED DESCRIPTION

In order to more easily understand the present invention, several models for speech production are developed in this detailed description. These models help suggest a theory for stuttering and provide an explanation of how the aforementioned auditory feedback systems work to reduce stuttering. By using the model and stuttering theory described hereinbelow in conjunction with FIGS. 2–5, the inventor has invented a novel treatment for stuttering, embodiments of which are described in conjunction with FIGS. 6–11.

Figure 2:
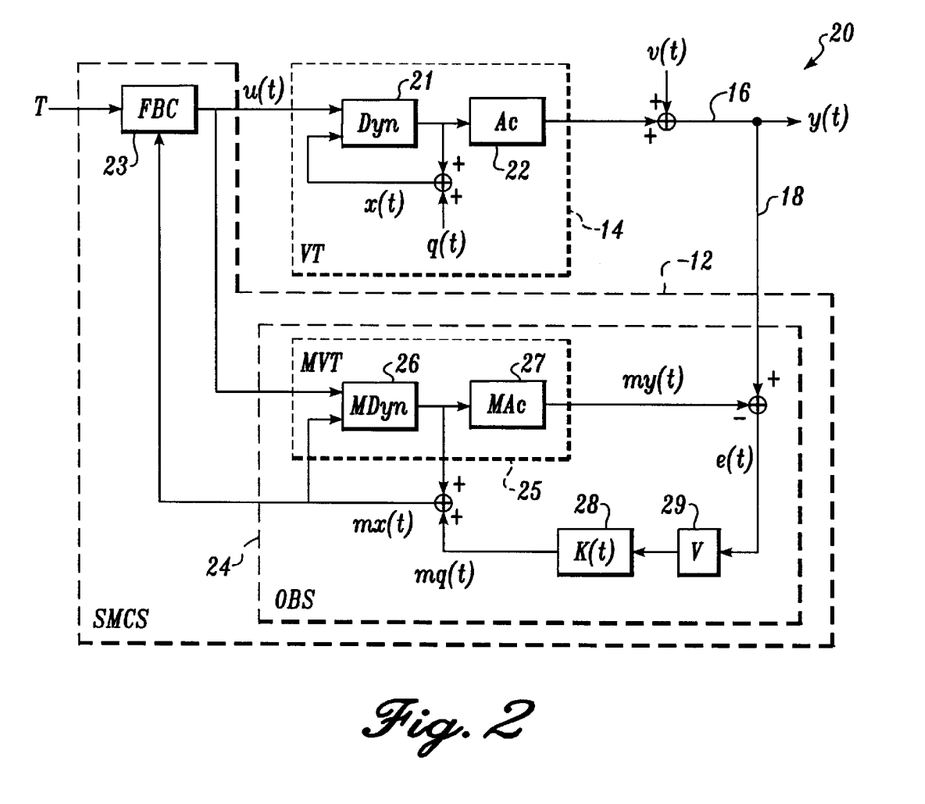
FIG. 2 is a block diagram illustrative of an observer-based control system model for speech production, according to one embodiment of the present invention.

FIG. 2 is a block diagram illustrative of an observer-based control system model 20 for speech production, according to one embodiment of the present invention. Model 20 is a more detailed version of model 10 (FIG. 1). VT 14 includes dynamics (Dyn) 21 and acoustics (Ac) 22. Dyn 21 determine how the current state x(t) of VT 14 is affected by the speech control signals or muscular controls u(t). More specifically, the current state x(t) represents the position and velocities of the vocal tract articulators. Ac 22 determine the output sound produced by the current state x(t) of the vocal tract articulators. Dyn 21 and Ac 22 are well known in the art of control theory and speech production (e.g., see O'Shaughnessy, D., "Speech Communications", 1987; and also Saltzman, E. and Kelso, J. A., "Skilled Actions: a task-dynamic approach", Psychological Review, Vol. 94, No. 1, pp. 84–106, January 1987). In addition, model 20 also includes state noise q(t), representing random or pseudorandom disturbances to the state x(t) of the vocal tract articulators and output noise v(t), representing random or pseudorandom disturbances to the sound y(t) output by VT 14.

In model 20, SMCS 12 includes a feedback controller (FBC) 23 and an observer (OBS) 24 having an internal model of the vocal tract (MVT) 25. FBC 23 is a brain function that processes the target sound T to generate the speech muscular control signals u(t). OBS 24 is a brain function that maintains an internal model of the vocal tract (i.e., MVT 25) that also operates on the speech muscular control signals u(t) to generate internal modeled speech output signals my(t). MVT 25 provides an explanation as to why speakers who later become deaf can continue to speak intelligibly. A standard negative feedback model tends to preclude this phenomenon.

Because the only available source of information to model the state noise q(t) in VT 14 is y(t), SMCS 12 includes observer-based control mechanism in OBS 24 similar to the observer disclosed by O. L. R. Jacobs in "Introduction to Control Theory", Oxford Univ. Press, 1994. More specifically, the modeled voice output signals my(t) are subtracted from the voice output signals y(t) to generate output prediction error signals e(t). The error signals e(t) are then operated on by a gain function 28 and a validator 29 to generate an estimated state noise mq(t). The estimated state noise mq(t) is then added to output signals of Mdyn 26 to generate modeled current state mx(t). In this model, OBS 24 is believed to set gain function 28 so as to minimize the mean squared error of x(t) and mx(t), which can be characterized as a Kalman gain K(t). OBS 24 can then be described as a modified Kalman filter, which are well known (e.g., Jacobs, O. L. R., "Introduction to Control Theory", 1994; Anderson, B. and Moore, J., "Optimal Filtering", Prentice Hall, 1979).

In this model, a Kalman filter would operate to estimate the uncertainty in y(t) and the uncertainty in x(t). The uncertainty in x(t) is represented by the state noise q(t). Because state noise is a function of the physiology of VT 14 (i.e., a condition of the speaker's body), SMCS 12 is assumed to know the state noise fairly accurately. Similarly, the uncertainty in y(t) is represented by the output noise v(t). However, because v(t) is a function of the noise in the environment, it is assumed SMCS 12 does not know the output noise but must instead make an estimation. It is believed that a brain function in SMCS 12 (not shown) uses the error signals e(t) as a measure of output noise v(t). This assumption is made because my(t) can be used as an estimate of the undistorted y(t), which when subtracted from y(t), leaves only the distortion. Thus, it is believed that SMCS 12 uses the error signals e(t) and the "known" q(t) to set the value of K(t) (i.e., Kalman gain function 28) to some substantially constant value appropriate for the average amount of state and output noise the speaker is experiencing.

In addition, as previously mentioned, OBS 24 is also believed to internally estimate the state noise, i.e., mq(t), to more accurately generate the modeled voice output signals my(t). However, model 20 includes validator 29 which is believed to reject error signals e(t) that may not accurately represent the state noise q(t). The reasoning for including validator 29 is as follows. For a stable VT 14, state noise likely only produces small deviations of x(t) compared to mx(t). Consequently, state noise should produce small deviations of y(t) from my(t). Thus, a small e(t) likely results from low uncertainty in y(t) and, consequently, e(t) represents a valid measure of the state noise. Accordingly, in this scenario, Kalman gain function 28 should be set relatively high (e.g., close to one).

In contrast, large deviations of y(t) compared to my(t) are less likely to caused by state noise and more likely to be caused by output noise v(t) and, in particular, external noise sources in the environment. Thus, for large e(t), it is believed that y(t) is highly uncertain and, therefore, e(t) is not a valid measure of state noise. Accordingly, in this scenario, Kalman gain function 28 should be set relatively low.

Figure 3:
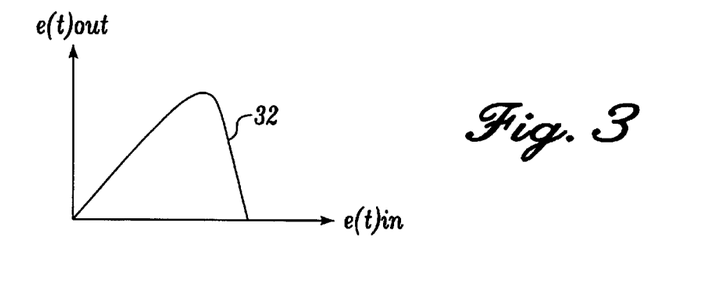
FIG. 3 is a diagram illustrative of a validation function performed in the model of FIG. 2, in accordance with one embodiment of the present invention.

FIG. 3 is a graph with a curve 32 illustrative of the function of validator 29 (FIG. 2). For low values of received error signals e(t), curve 32 has slope of approaching one (i.e., representing a gain approaching one), so that validator 29 outputs e(t) substantially unchanged. However, for relatively large values of received error signals e(t), curve 32 has a slope of about of zero (representing a gain of about zero). Thus, the internal OBS feedback path is, in effect, shut off, thereby stabilizing the system. This model readily explains the observed stuttering reduction in the aforementioned auditory feedback studies. The modified feedback creates large error signals e(t), which causes validator 29 to shut off the feedback path through Kalman gain function 28.

Figure 4:
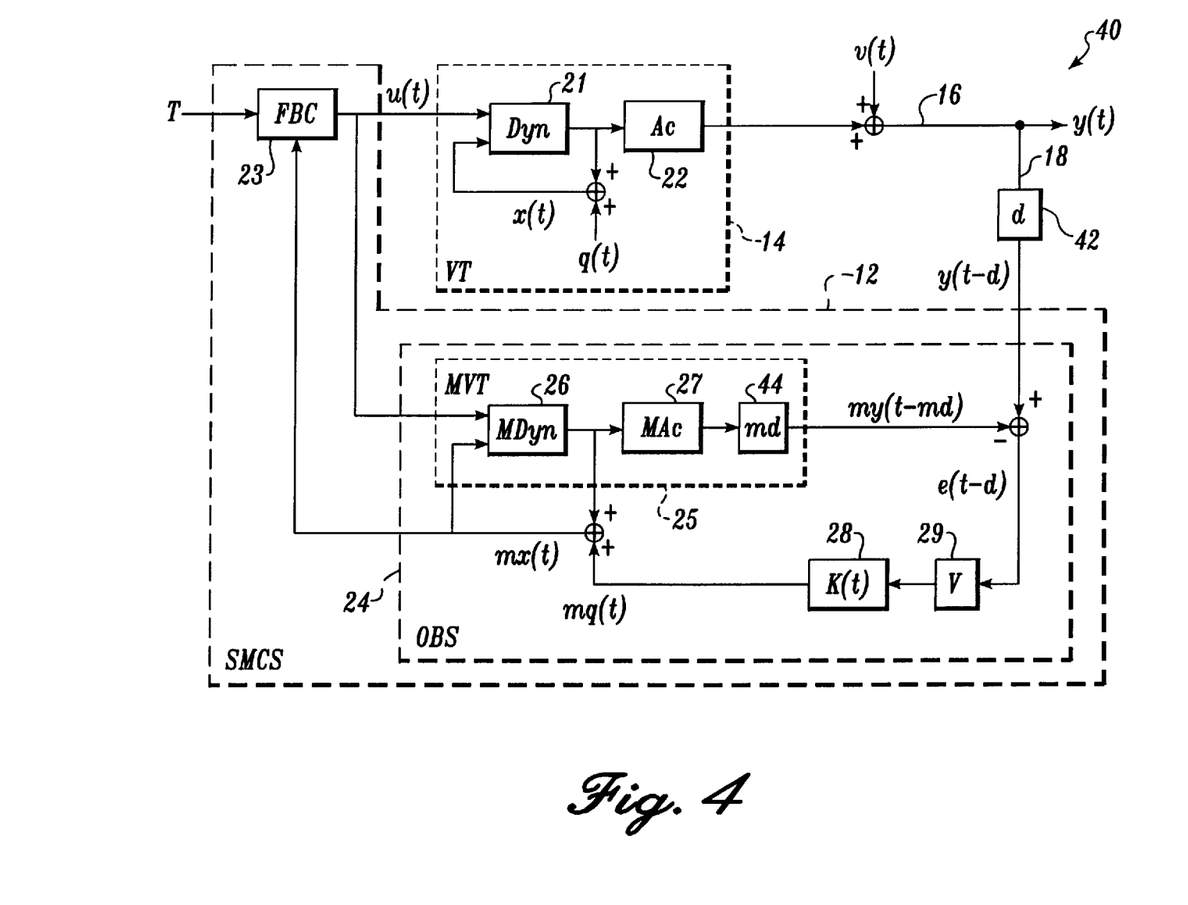
FIG. 4 is a block diagram illustrative of a Smith-predictor model for speech production, in accordance with one embodiment of the present invention.

FIG. 4 is a block diagram illustrative of a model 40 adapted from a Smith predictor control system, in accordance with one embodiment of the present invention speech production. Smith-predictor control theory is disclosed in Marshall, J. E., "Control of Time-Delay Systems" Institute of Electrical Engineers, London, 1979. Model 40 is similar to model 20 (FIG. 2) except that a delay block 42 is inserted to model the delay d believed to be incurred in the propagation of y(t) to OBS 24. That is, OBS 24 receives a voice output signal y(t-d) instead of y(t) as in model 20. In addition, MVT 25 in model 40 includes a model delay 44 corresponding to delay 42 to "synchronize" the heard voice output signals y(t-d) with the modeled voice output signals my(t-md) to generate accurate prediction error signals e(t-d), where md approximates d.

Delay 42 tends to decrease correlation between x(t) and y(t-d), which tends to increase the uncertainty in y(t). Thus, K(t), i.e., the Kalman gain function 28 should be decreased because it is less certain that the error signals validly represent the state noise. In addition, according to control theory, delay also tends to require a decrease in K(t) to maintain stability in the feedback system. Because delay 42 is generally constant, as shown in model 50 of FIG. 5, Kalman gain function 28 includes a generally constant feedback reduction factor (kd) 52 attributable to delay 42. The gain of kd 52 is less than one, resulting in a reduction or decrease in the total gain of Kalman gain function 28. However, if kd 52 is too large, the reduction of K(t) is too small, resulting in an unstable system. Accordingly, the inventor of the present invention has developed a theory that stuttering is caused by SMCS 12 setting kd 52 too high. Stated another way, SMCS 12 in stutterers fail to properly inhibit auditory feedback when the stutterer is speaking.

Figure 5:
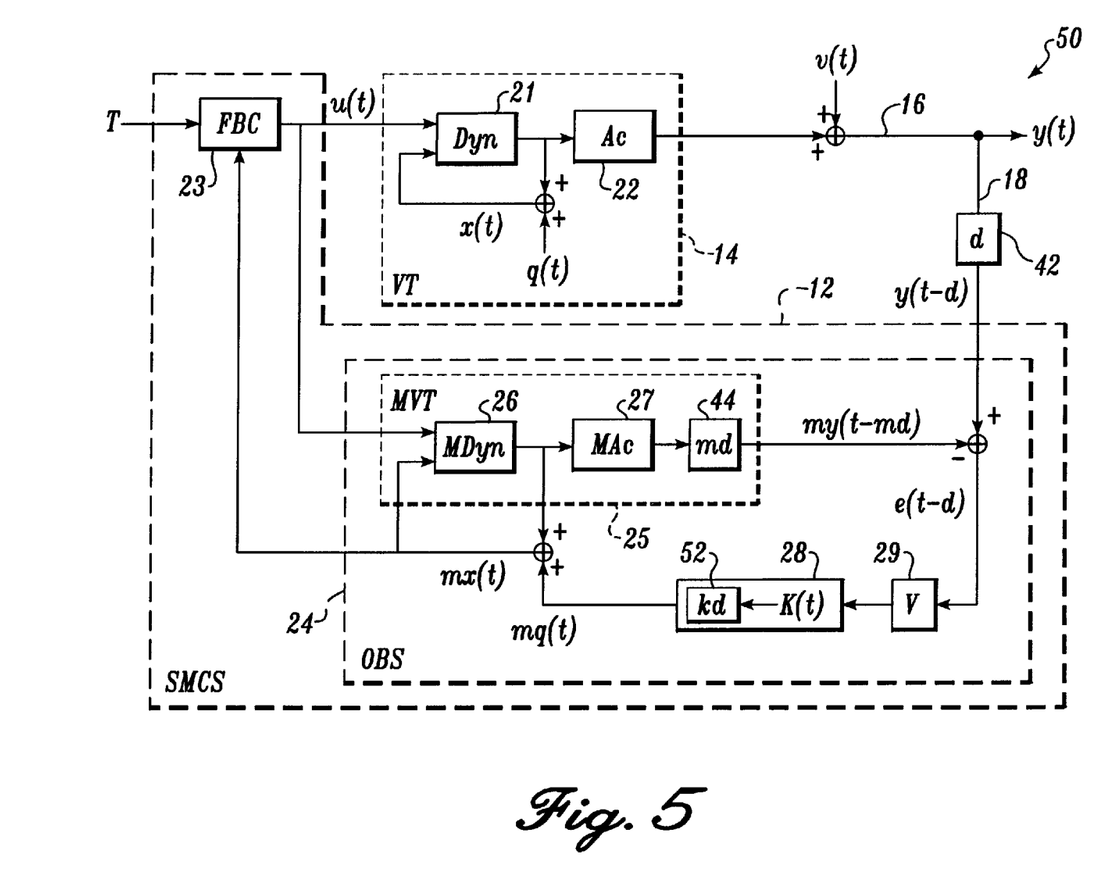
FIG. 5 is a block diagram illustrative of a modified Smith-predictor model for speech production, in accordance with one embodiment of the present invention.
Figure 6:
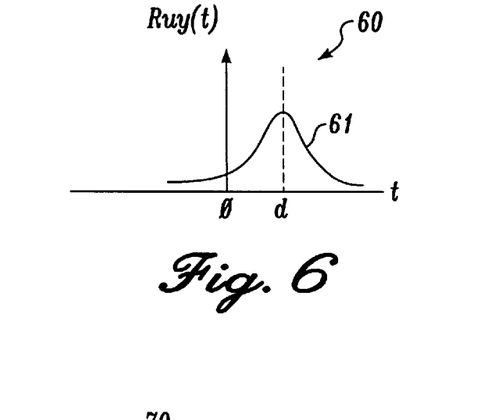
FIG. 6 is a diagram illustrative of a correlation function corresponding to the Kalman feedback delay gain of model of FIG. 5, according to one embodiment of the present invention.

It is believed that SMSC 12 sets kd 52 by measuring the correlation between the applied speech muscular control signals u(t) and the heard voice output signals y(t-d). Further, it is believed that when validator 29 shuts off the feedback path, the mechanism for setting kd 52 is also shut off. As shown in FIG. 6, the long-term average of this correlation peaks at time delay d and is monotonic increasing from time delay zero up to time delay d. Thus, knowing the general shape of this correlation, if at time delay zero SMSC 12 finds that the correlation is relatively small, a relatively large value of d is indicated. As described above, increasing delay 42 in a Smith-predictor requires a decrease in kd 52 and, thus, SMSC 12 would be expected to decrease kd 52. In contrast, if SMSC 12 finds that the correlation is relatively large, a relatively small value of d is indicated and SMSC 12 would be expected to increase kd 52. In a stutterer, it is believed that this mechanism for setting kd 52 is debilitated in some way to set kd 52 higher than is appropriate.

Figure 7:
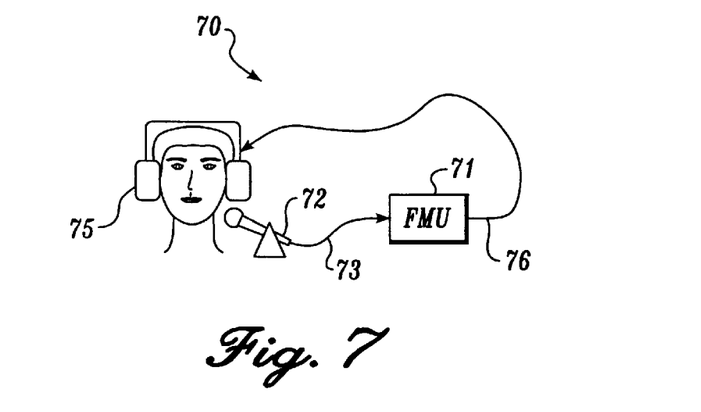
FIG. 7 is a block diagram illustrative of an auditory feedback system to reduce stuttering, according to one embodiment of the present invention.

In accordance with the present invention, based on this kd setting mechanism, a treatment for stuttering is directed toward decreasing the correlation of u(t) and y(t-d) so as to drive SMSC 12 to decrease kd 52. FIG. 7 is a block diagram illustrative of an auditory feedback system 70 for use in a treatment to reduce stuttering, according to one embodiment of the present invention. System 70 includes a feedback modifier unit (FMU) 71 connected to receive signals from a microphone 72 via a line 73. FMU 71 is also connected to a set of earphones 75 via a line 76. Although a conventional microphone and earphone set are described, other embodiments may use any suitable acoustic input and output devices. For example, the acoustic input device can be a transducer device for converting acoustic signals into representative electrical or optical signals. Likewise, the acoustic output device can be a transducer device for converting an electrical or optical signal into a representative acoustic signal that can be heard by the stutterer.

In operation, the stutterer speaks into microphone 72, which converts the speech into a corresponding electrical signal. FMU 71 receives the electrical signal and, in accordance with the present invention, selectively modifies the electrical signal to reduce the correlation between u(t) and y(t-d), as is described in more detail below in conjunction with FIGS. 8–11. In particular, FMU 71 introduces a slight perturbation to the heard voice signal y(t-d) that is small enough to pass through validator 29 (FIG. 5). This perturbation in y(t-d) tends to decrease the correlation between u(t) and y(t-d), causing SMSC 12 to think that delay 42 is increased. As described above, it is believed that SMSC 12 will react to this "increased" delay by decreasing kd 52 to keep the system stable. Further, it is believed that after prolonged treatment (e.g., about three—five sessions per week over about two—three months), kd 52 will be driven to a lower value and will persist for a significant time period after the treatment. Thus, it is expected that stuttering will be reduced, with the added advantage that the stutterer will not need to carry auditory feedback equipment throughout the course of the day. It is envisioned that the stutterer will adhere to a regular treatment program to maintain kd 52 at a desired lowered value.

Figure 8:
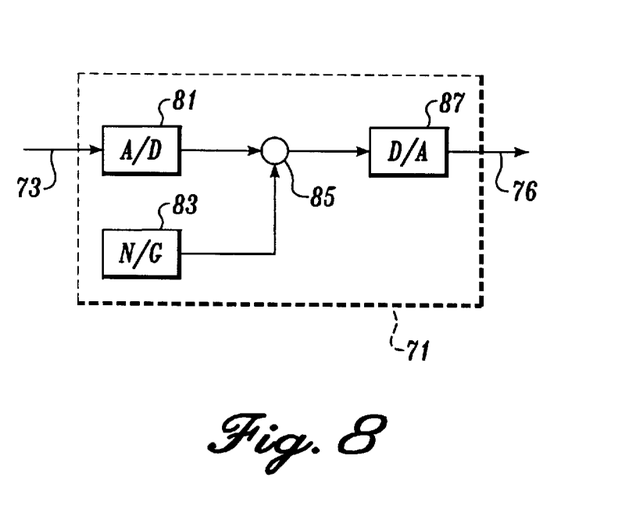
FIG. 8 is a simplified functional block diagram of a feedback modifier, according to one embodiment of the present invention.

FIG. 8 is a simplified functional block diagram of FMU 71 (FIG. 7), according to one embodiment of the present invention. FMU 71 includes an analog-to-digital converter (A/D) 81, a digital noise generator (NG) 83, a combiner 85 and a digital-to-analog converter (D/A) 87. A/D 81 is connected to receive the electrical signal from microphone 72 (FIG. 7) over line 73 and convert the analog voice signal into a digital signal that is received by combiner 85. In this embodiment, NG 83 can be a gaussian noise (i.e., white noise) generator, configured to provide random noise signals to combiner 85. In this type of embodiment, combiner 85 would be implemented with a conventional adder. This added noise would have an average power below the threshold of validator 29 (FIG. 5) so as to be passed on through to Kalman gain function 28 (FIG. 5) to be used in the correlation of u(t) and y(t-d). It is expected that white noise with a power less than forty dB SPL will be suitable.

Although a digital embodiment is described, in light of this disclosure those skilled in the art of auditory feedback will be able to implement corresponding analog embodiments without undue experimentation. For example, A/D 81 and D/A 87 can be deleted, with a conventional directional coupler to implement combiner 85 when NG 83 is gaussian noise generator. Alternatively, NG 83 can be a frequency synthesizer configured to provide a randomly shifting frequency, with combiner 85 implemented with a conventional mixer, which would cause the spectrum of the voice signal to be randomly shifted.

Figure 9:
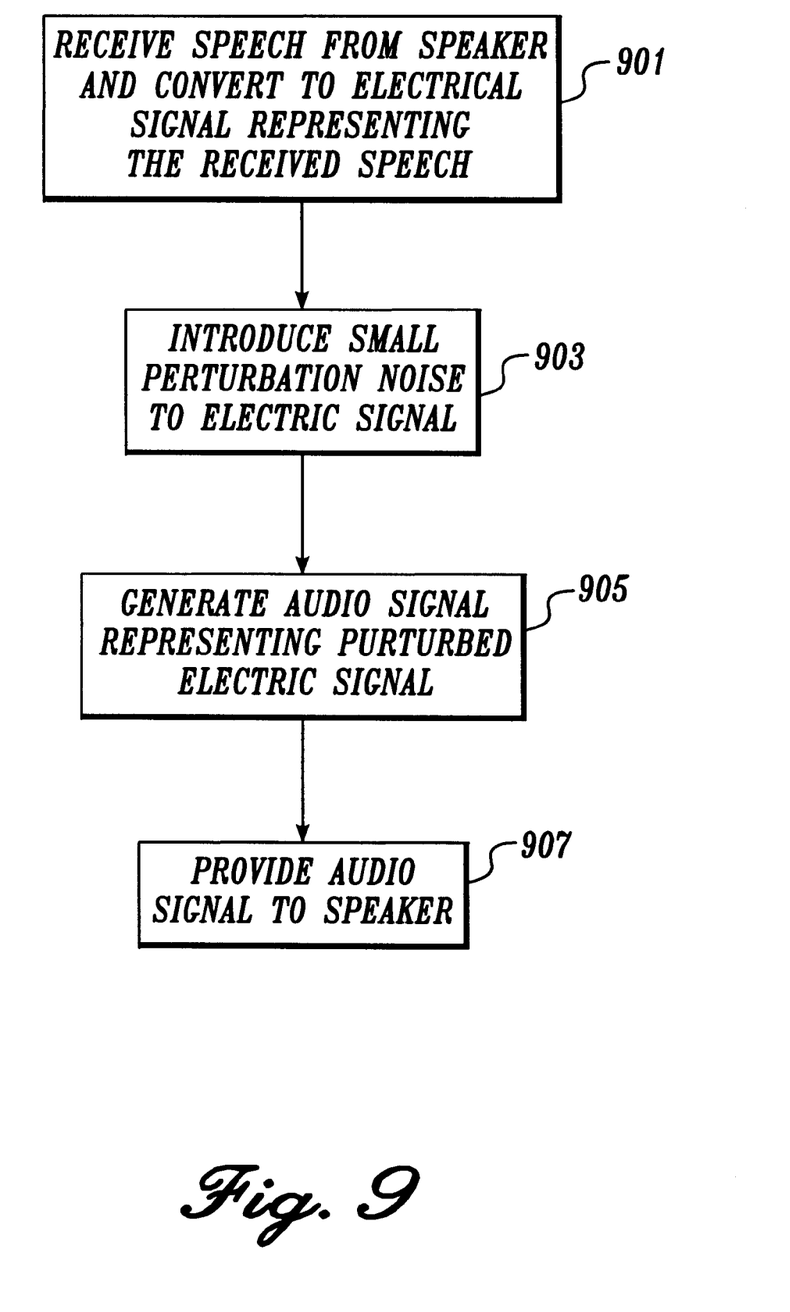
FIG. 9 is a flow diagram illustrative of the operation of a feedback modifier, according to one embodiment of the present invention.

FIG. 9 is a flow diagram illustrative of the operation of FMU 71 (FIG. 8), according to one embodiment of the present invention. Referring to FIGS. 7–9, FMU 71 operates as follows. In an initial step, the stutterer performs a speaking exercise in which the stutterer's speech in converted from analog acoustic signals to analog electrical signals. As described above, this conversion is implemented through microphone 72. This electrical signal is representative of heard voice signal y(t-d) (FIG. 5). The electrical signal can then be digitized or left in analog form, as described above in conjunction with FIG. 8.

In a next step 903, a slight perturbation is introduced into the electrical signal. The perturbation can be additive noise, slight phase shifting, or a slight shifting or jittering of the electrical signal's spectrum or in the speech formants. The slight perturbation is intended to reduce the correlation between the speech muscular control signals u(t) and the heard voice signals y(t-d). As is described above, the reduced correlation is believed to cause SMSC 12 (FIG. 5) to start reducing the Kalman delay reduction factor kd 52 (FIG. 5). Because stuttering is believed to be caused by model 50 being unstable and, further, that a relative high setting of kd 52 is believed to make the control system unstable, reducing kd 52 is believed to reduce stuttering.

In a next step 905, an acoustic signal is then generated from the slightly perturbed electrical signal. In a step 907, the acoustic signal is fed back to the stutterer through earphones 75. This allows the stutterer to receive the slightly perturbed y(t-d) signals, which are used to reduce kd 52 as described above. After a program of treatment using the system described above in FIGS. 5 and 7-9, the stutterer should have a reduced kd 52, which is expected to persist for a significant time after the treatment program. Thus, the stutterer will have a reduced incidence of stuttering without having to carry acoustic feedback equipment.

Figure 10:
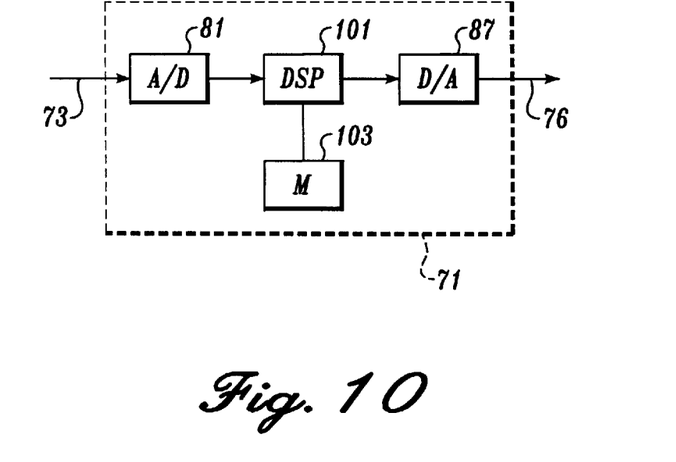
FIG. 10 is a block diagram of feedback modifier using a digital signal processor, according to one embodiment of the present invention.

FIG. 10 is a block diagram of FMU 71 having a digital signal processor (DSP) 101, according to one embodiment of the present invention. This embodiment is similar to the embodiment of FIG. 8 except that DSP 101 replaces NG 83 and combiner 85. DSP 101 can be an suitable commercially available DSP such as, for example, a model DSP-96 available from Ariel Corp., the databook and programming manual of which is incorporated herein by reference. DSP 101 is configured in conventional manner (i.e., software or firmware programming) to implement NG 83 (FIG. 8). DSP 101 provides the flexibility and functionality to generate and introduce additive noise-type perturbations, phase delay-type perturbations or frequency-type perturbations, as desired. More specifically, DSP 101 can execute a software or firmware program stored in a memory 103 to introduce the desired perturbation into the received electrical signals. Memory 103 can be implemented using any suitable type of memory device such as, for example, a DRA, SRAM or EPROM or combination thereof.

In this embodiment, DSP 101 is operated at a clock rate of about thirty MHz and processes sixteen-bit samples generated by A/D 81 at a ten kHz sampling rate. In light of this disclosure those skilled in the art of auditory feedback can use standard digital signal processing techniques to generate the desired perturbation and introduce the perturbations to the received digital samples. For example, a particular embodiment of a frequency perturbation FMU implemented using DSP 101 is described below in conjunction with FIG. 11. The perturbed digital samples are then received by D/A 87 and converted back into an audio signal, which is received by earphones 75 (FIG. 7). This processing is performed in "real time" so as to minimize the delay in feeding back the perturbed y(t-d) signals to OBS 24. Preferably, the processing delay of FMU 71 is about thirty milliseconds or less. Longer delays tend to cause a large perturbation in y(t-d) so that validator 29 would shut off the internal feedback path, as described in the aforementioned auditory feedback studies.

Figure 11:
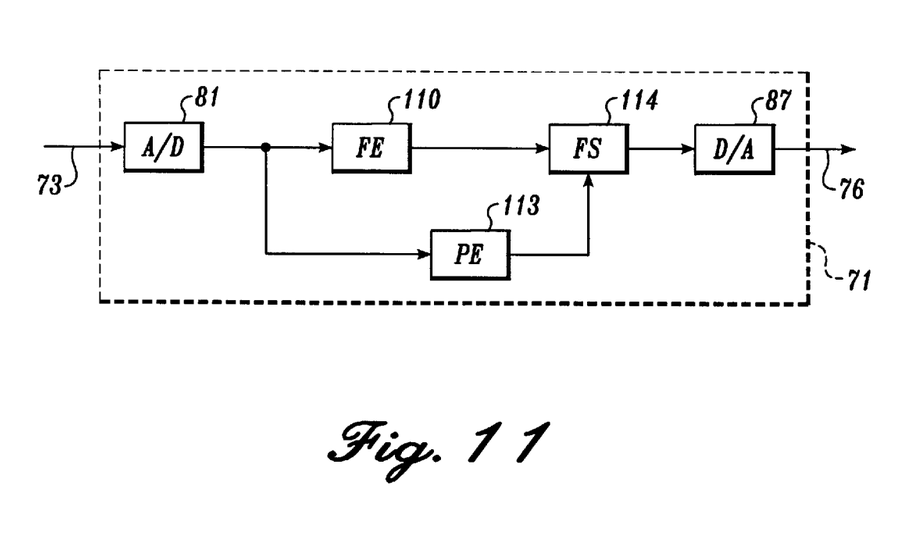
FIG. 11 is a block diagram of a formant-based feedback modifier, according to one embodiment of the present invention.

FIG. 11 is a block diagram of FMU 71 using a formant detection and modification, according to one embodiment of the present invention. This embodiment is adapted from a feedback modifier described by John F. Houde in "Sensorimotor Adaptation in Speech Production", Doctoral Dissertation, Massachusetts Institute of Technology, 1997, which is incorporated herein by reference.

In this embodiment, FMU 71 includes a formant estimator 110, pitch extractor 113 and a formant synthesizer 114, which are implemented by DSP 101 (FIG. 10). This embodiment is implemented and operates in substantially the same manner as described in the aforementioned Dissertation, except that pitch extractor 113 and formant synthesizer 114 are further configured to introduce slight alterations in the synthesized formant frequencies. For example, random small (e.g., about thirty-to-sixty hertz) shifts in formant frequencies may be introduced. Although described in the aforementioned Dissertation, a brief description of this embodiment is included below for completeness.

Formant estimator 110 receives the digitized electrical signal from A/D 81 and is configured to estimate the formants of the sounds produced by the stutterer during the treatment session. The pitch extractor 113 and formant synthesizer 114 introduce the formant frequency perturbation. This embodiment is a modification of a formant vocoder as disclosed in the aforementioned O'Shaughnessy reference.

The aforementioned related application Ser. No. 09/001, 508 discloses feedback modification for accent reduction, which includes an embodiment having a formant estimator, formant pattern recognizer, pitch extractor and formant synthesizer. However, the pitch extractor and formant synthesizer of the Ser. No. 09/001,508 application do not perturb the synthesized formant output signals in the manner of the present invention. In addition, the Ser. No. 09/001,508 application discloses a cue generator that is used to generate a cue for sensitizing the speaker to preselected formants so that the speaker can more easily reduce a foreign accent, learn a new language, or reduce injury-caused speech impediments (e.g. stroke patients who have sustained injury to their speech motor control system).

The embodiments of the feedback modification system for reducing stuttering described above are illustrative of the principles of the present invention and are not intended to limit the invention to the particular embodiments described. For example, in light of the present disclosure, those skilled in the art of auditory feedback can devise other implementations of the feedback modifier using different processors or microphone or speaker devices without undue experimentation. Further, different types of low perturbation noise may be used instead of the types described. Accordingly, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of treatment for a stutterer to reducing stuttering, the method comprising:

receiving a series of sounds uttered by the stutterer and responsive thereto generating an input signal corresponding to the series of sounds using an acoustic input device;

introducing perturbations to the input signal to form an output signal using a feedback modifier, wherein the perturbations are configured to reduce correlation between the stutterer's target sounds and the sounds uttered by the stutterer; and feeding back the output signal to the stutterer in a form that can be sensed by the stutterer without disrupting feedback in the stutterer's speech motor control system when the output signal is sensed by the stutterer.

2. The method of claim 1 wherein the series of perturbed sounds is fed back to the stutterer with a delay of less than or equal to thirty milliseconds.

3. The method of claim 1 wherein the perturbations comprise additive uncorrelated noise.

4. The method of claim 3 wherein the additive uncorrelated noise has an average power of less than or equal to forty dB SPL.

5. The method of claim 1 wherein the perturbations comprise frequency modification of the series of sounds.

6. The method of claim 5 wherein the frequency modification comprises a frequency shift in a spectrum of the series of sounds.

7. The method of claim 6 wherein the frequency modification comprises altering formant frequencies of formants in the series of sounds.

8. The method of claim 7 wherein the frequency shift is in the range of thirty hertz to sixty hertz.

9. An apparatus for use in providing treatment for a stutterer to reduce stuttering, the apparatus comprising:

means for receiving a series of sounds uttered by the stutterer and generating an input signal corresponding to the series of sounds;

means for introducing perturbations to the input signal to form an output signal, wherein the perturbations are sized to reduce correlation between the stutterer's target sounds and the sounds uttered by the stutterer; and means for feeding back the output signal to the stutterer in a form that can be sensed by the stutterer without disrupting feedback in the stutterer's speech motor control system when the output signal is sensed by the stutterer.

10. The apparatus of claim 9 wherein the series of perturbed sounds is fed back to the stutterer with a delay less than thirty milliseconds.

11. The apparatus of claim 9 wherein the perturbations comprise additive uncorrelated noise having an average power of less than or equal to forty dB SPL.

12. The apparatus of claim 9 wherein the perturbations comprise frequency modification of the series of sounds.

13. The apparatus of claim 12 wherein the frequency modification comprises altering formant frequencies of formants in the series of sounds.

14. The apparatus of claim 13 wherein the frequency modification comprises a frequency shift in the range of thirty hertz to sixty hertz.

15. A system for providing treatment to a stutterer for reducing stuttering, the system comprising:

an acoustic input device, wherein the acoustic input device is configured to receive a series of input sounds uttered by the stutterer and responsive thereto generate an input signal corresponding to the series of input sounds;

an acoustic output device, wherein the acoustic output device is configured to receive an output signal and responsive thereto generate a series of output sounds corresponding to the output signal that can be sensed by the stutterer; and a feedback modifier coupled to the acoustic input device and the acoustic output device, wherein the feedback modifier is configured to introduce perturbations to the input signal to generate the output signal, wherein the perturbations are configured to reduce correlation between the stutterer's target sounds and the sounds uttered by the stutterer without disrupting feedback in the stutterer's speech motor control system when the series of output sounds are sensed by the stutterer.

16. The system of claim 15 wherein the series of output sounds is fed back to the stutterer with a delay less than or equal to thirty milliseconds.

17. The system of claim 15 wherein the perturbations comprise additive uncorrelated noise having an average power of less than or equal to forty dB SPL.

18. The system of claim 15 wherein the perturbations comprise frequency modification of the series of input sounds.

19. The system of claim 18 wherein the frequency modification comprises altering formant frequencies of formants in the series of input sounds.

20. The system of claim 19 wherein the frequency modification comprises a frequency shift in the range of thirty hertz to sixty hertz.

21. A feedback modifier for use in a system for providing treatment for a stutterer to reduce stuttering, the feedback modifier comprising:

an input port configured to be coupled to an acoustic input device, the acoustic input device being configured to receive a series of input sounds uttered by the stutterer and responsive thereto generate an input signal corresponding to the series of input sounds;

an output port configured to be coupled to an acoustic output device, wherein the acoustic output device is configured to receive an output signal and responsive thereto generate a series of output sounds corresponding to the output signal that can be sensed by the stutterer; and a digital signal processor (DSP) system coupled to the acoustic input device and the acoustic output device, wherein the DSP system is configured to introduce perturbations to the input signal to generate the output signal, the perturbations being configured to reduce correlation between the stutterer's target sounds and the sounds uttered by the stutterer without disrupting feedback in the stutterer's speech motor control system when the series of output sounds are sensed by the stutterer.

22. The feedback modifier of claim 21 wherein the series of output sounds is fed back to the stutterer with a delay less than or equal to thirty milliseconds.

23. The feedback modifier of claim 21 wherein the perturbations comprise additive uncorrelated noise having an average power of less than or equal to forty dB SPL.

24. The feedback modifier of claim 21 wherein the perturbations comprise altering formant frequencies of formants in the series of input sounds.

* * * * *

UNITED STATES PATENT AND TRADEMARK OFFICE
CERTIFICATE OF CORRECTION

PATENT NO. : 5,940,798  
DATED : August 17, 1999  
INVENTOR(S) : J.F. Houde

Page 1 of 2

It is certified that error appears in the above-identified patent and that said Letters Patent is hereby corrected as shown below:

| COLUMN | LINE | |
|---|---|---|
| [56] Pg. 1, col. 1 | Refs. Cited (Other Publs. Item 1) | after "Sciences" insert --,-- |
| [56] Pg. 1, col. 2 | Refs. Cited (Other Publs. Item 4) | "patients" should read --patients'-- |
| [56] Pg. 1, col. 2 | Refs. Cited (Other Publs. Item 4) | "Disordrers," should read --Disorders-- |
| [56] Pg. 1, col. 2 | Refs. Cited (Other Publs. Item 4) | "germany" should read --Germany-- |
| [56] Pg. 1, col. 2 | Refs. Cited (Other Publs. Item 5) | "canada" should read --Canada-- |

UNITED STATES PATENT AND TRADEMARK OFFICE
CERTIFICATE OF CORRECTION

PATENT NO. : 5,940,798
DATED : August 17, 1999
INVENTOR(S) : J.F. Houde

It is certified that error appears in the above-identified patent and that said Letters Patent is hereby corrected as shown below:

COLUMN    LINE

8    57    "to reducing" should read --to reduce--
(Claim 1,    line 1)

Signed and Sealed this

Sixth Day of June, 2000

Attest:

Q. TODD DICKINSON

*Attesting Officer*    *Director of Patents and Trademarks*